Jan. 14, 1969 E. C. LETTER 3,421,915
METHOD FOR FORMING STRONG METALLIC BONDS TO LEAD-CONTAINING GLASS
Filed Nov. 28, 1967
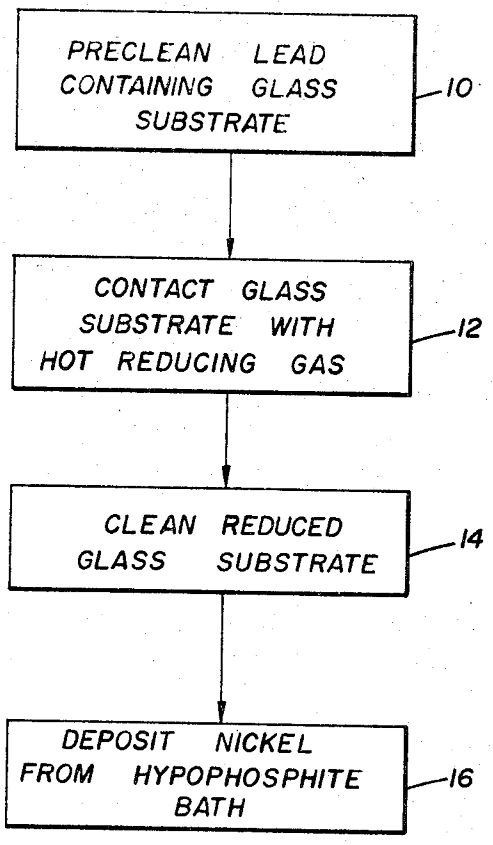
EUGENE C. LETTER
INVENTOR.
BY Charles C. Krawczyk
ATTORNEY

1

3,421,915
METHOD FOR FORMING STRONG METALLIC BONDS TO LEAD-CONTAINING GLASS

Eugene C. Letter, Penfield, N.Y., assignor to Bausch & Lomb Incorporated, Rochester, N.Y., a corporation of New York Continuation-in-part of application Ser. No. 311,958, Sept. 27, 1963. This application Nov. 28, 1967, Ser. No. 686,032
U.S. Cl. 117—54 9 Claims
Int. Cl. B44d *5/00;* C03c *17/10*

ABSTRACT OF THE DISCLOSURE

A strong metallic bond is formed on a lead-containing glass, such lead silicate glass or lead borate glass containing at least 9 weight percent lead oxide and preferably above 15 weight percent. The lead containing glass substrate is placed in a hot reducing gas atmosphere to reduce a thin layer of the lead oxide within the glass surface. A nickel layer is subsequently deposited on the surface containing reduced lead.

*Cross-references to related applications*

This is a continuation-in-part of a copending application, Ser. No. 311,958, filed Sept. 27, 1963, now abandoned for Eugene C. Letter, the inventor of the present application and assigned to the assignee of the present application.

This invention relates to an improved method for forming a ceramic metallic bond and more particularly to an improved method for bonding nickle to a lead containing glass surface.

Numerous methods for forming ceramic-metallic bonds have been proposed by the prior art. For example, ceramic and glass bodies have been coated with a silver paint, fired, and subsequently soldered to form a metallic-ceramic bond. In other cases, a ceramic member has been coated in vacuo with a metallic film. One method for improving the vacum coating process comprises introducing oxygen into the process to react with the metal being deposited, to thereby improve the oxide bond.

The aforementioned processes are satisfactory for some applications, however, are not satisfactory in other applications. For example, the development of lead containing ultrasonic delay line glasses has increased the demand for an improved method of bonding metal to a ceramic body. Delay lines often require a ceramic-metallic bond having controlled dimensions which are mechanically strong. Such bonds must resist separation and perform satisfactorily over a wide temperature range even though the temperature coefficients of the two mtaerials may differ substantialy. Additionally, the bonds should have favorable ultrasonic transmission characteristics with a minimum of attentuation over a relatively wide range. It is further desired to produce a bond in a manner which facilitates manufacturing procedures while tending to minimize the cost of bonding the dissimilar materials.

The method of formnig a ceramic-metallic bond according to the present invention is particularly advantageous for manufacturing ultrasonic delay lines. The dimensions of such bonds may be controlled within satisfactory tolerances, possess adequate mechanical strength for delay line applications, and perform satisfactorily over a temperature range of about $-50°$ C. to $+100°$ C. even though the temperature coefficients of the two materials differ substantially. In addition, bonds which have relatively good ultrasonic transmission characteristics may be made by a process according to the present invention. Furthermore, the method of forming such bonds tends to minimize the costs of forming a satisfactory bond and facilitates manufacturing ultrasonic delay lines.

2

*Summary of the invention*

Briefly, the novel method of forming a ceramic-metallic bond according to the present invention comprises the steps of providing a ceramic substrate, such as a lead containing glass which has available lead ions at or near the surface thereof, reducing a thin layer of lead ions at and within the surface of the ceramic substrate, and depositing a nickel film on the surface which contains the reduced lead ions.

In carrying out the present invention according to the preferred embodiment, a glass substrate is produced which has lead ions as a constituent part thereof. The lead ions at or near the surface of the glass are reduced by placing the substrate in asuitable container such as a closed furnace containing a reducing gas, such as relatively pure hydrogen or natural gas, and heating the substrate at an elevated temperature in the reducing gas atmosphere. It is presently thought that the lead ions are reduced to a form comprising colloidal metal within the glass surface. Subsequently, nickel is deposited onto the surface and adheres to the reduced surface of the glass. Since the lead ions have been reduced, this bond is basically different than the oxide bonds produced by conventional techniques.

*Brief description of the drawings*

The figure is a block diagram illustrating the method of the invention.

*Description of the preferred embodiments*

Examples of lead containing glasses, such as "Alkali-Lead Silicate" glass, are found in the U.S. Patent 2,964,-414 "Glass Composition and Method of Making It" issued to Robert H. Dalton and George B. Hares and U.S. Patent 3,154,425 "Temperature Stable Ultrasonic Delay Lines" issued to Herbert L. Hoover and Martin E. Nordberg. Other examples of lead containing glasses are illustrated in Table I. Although most of the glasses in the examples are lead silicate glass, it is to be understood that the teachings of this application will apply also to lead borate glass. For examples of the lead borate glass, $B_2O_3$ can be substituted for $SiO_2$ in most cases by a ratio of one half mole of $B_2O_3$ for each mole of $SiO_2$. On the other hand, it has been found that the substitution of phosphate for silica results in a glass in which the lead ions cannot be reduced to a metallic state in a reducing atmosphere at a reasonable elevated temperature.

Producing a glass having lead ions therein may be accomplished according to conventional glass making techniques. For example, on alkali lead silicate glass consisting essentially of $SiO_2$ in the range of about 45 to 55 weight percent, $K_2O$ in the range of about 5–15 weight percent, PbO in the range of about 35 to 50 weight percent and additional glass modifiers may be produced by the following process. The ingredients are melted at about 2600° F., fired at this temperature and cooled to about 2100° F., thoroughly mixed as by stirring, and cast. The shaped bodies are then annealed at less than about 925°

F. similarly to ordinary crown opthalmic glasses of similar silica content.

TABLE 1.—LEAD CONTAINING GLASSES

| Wt. percent | A | B | C | D | E | F | G | H | I |
|---|---|---|---|---|---|---|---|---|---|
| $SiO_2$ | 67.8 | 53.2 | 46.6 | 35.3 | 15.0 | ---- | 40 | 45.0 | 8.2 |
| $K_2O$ | 11.2 | 8.0 | 6.4 | 3.0 | ---- | ---- | ---- | 7.8 | ---- |
| $Na_2O$ | 2.0 | 4.0 | ---- | ---- | ---- | ---- | ---- | ---- | ---- |
| PbO | 9.0 | 32.6 | 46.3 | 58.7 | 55.0 | 58.6 | 60 | 22.9 | 55.0 |
| ZnO | ---- | ---- | ---- | ---- | ---- | ---- | ---- | 8.3 | ---- |
| BaO | ---- | ---- | ---- | ---- | ---- | ---- | ---- | 15.5 | ---- |
| $PbF_2$ | ---- | ---- | ---- | ---- | 30.0 | 32.2 | ---- | ---- | 31.0 |
| $B_2O_3$ | ---- | ---- | ---- | ---- | ---- | 9.2 | ---- | ---- | 5.8 |
| Metal oxides | 10.0 | 2.2 | 0.7 | 3.0 | ---- | ---- | ---- | 0.5 | ---- |
| Approximate softening temp. °C | 600 | 500 | 450 | 500 | 350 | 300 | 500 | 600 | 300 |

The various elements in the glass compositions of Table 1 are designated in weight percent batch compositions and the glass is formed by a procedure similar to that set forth above.

A glass substrate having lead ions therein is first prepared for the hydrogen reduction of the lead ions by meticulously cleaning the surface thereof (block 10 of the figure). The cleaning operation may be accomplished by numerous methods such as those commonly employed in cleaning optical glass. One method comprises subjecting the substrate to ultrasonic vibrations while it is disposed in an aqueous solution containing alkali such as 5–20 percent of an alkali such as sodium hydroxide, and a wetting agent. The substrates are subsequently rinsed with water.

The lead ions within the glass substrate and near the surface are now reduced (block 12 of the figure). The cleaned glass substrate is placed in a furnace and hydrogen or natural gas is flowed through the furnace at about .02 standard cubic feet per minute. The temperature of a substrate containing at least 15 weight percent lead oxide is raised to about 200° to 500° C., preferably about 450° C., and maintained at about that temperature with its surface exposed to the hydrogen for about 1 to 4 hours. For lead containing glasses having less than 15 weight percent lead oxide the temperature may have to be increased to as high as 600° C., but not above the softening point of the glass. In the glass compositions having very high concentrations of $B_2O_3$, such as example F in Table I wherein all the glass former $SiO_2$ is replaced by $B_2O_3$, care must be taken so that the reduction time and temperature is not excessive to avoid the migration of lead out of the glass to form a metallic layer on the surface. This problem is not present in the other examples.

A second cleaning follows the reducing operation as illustrated by the block 14 of the figure. The second cleaning step may be accomplished by various techniques. However, since this operation is preparatory for a chemical plating step, it is desirable to select a cleaning process which is particularly compatible with the plating operation. The method utilized in the second cleaning step for preparing a reduced substrate to receive a nickel deposit from a chemical bath comprises placing the substrate in a bath of boiling trichlorethylene for a few minutes and subsequently placing the substrate in a bath of boiling ethanol. If it is desired to get rid of all organic material from the substrate, the substrate can be momentarily dipped in 15 percent aqueous hydrogen peroxide and subsequently rinsed in distilled or deionized water. After the substrate is rinsed, it is boiled in a relatively concentrated sodium hypophosphite bath for about 5 minutes.

Nickel is now deposited on the reduced lead by a hypophosphite bath as illustrated in the block 16 of the figure. The cleaned substrate having a reduced surface is placed in a boiling nickel bath for about 5 minutes. The bath comprises approximately one liter of distilled water, 30 grams of nickel chloride ($NiCl_2.6H_2O$), 10 grams sodium hypophosphite ($NaH_2PO_2.H_2$), 65 grams ammonium citrate $(NH_4)_2HC_6H_5O$, and 50 grams of ammonium chloride. Concentrated ammonium hydroxide ($NH_4OH$) is added to the solution prior to the plating operation until the solution turns from green to blue, i.e. until the solution has pH of 8–10. This pH is maintained by adding ammonium hydroxide during the plating operation.

It should be noted in the reducing step that a thin layer of lead oxide is reduced at the surface of the glass and also within the surface of the glass. The reduced lead does not separate from the glass structure, nor does it flow together into a continuous layer on top of the glass surface. The reduced lead acts as lead aggregates in a thin layer within the glass surface and as a part of the glass matrix. Since the reduced lead remains a part of the glass matrix, a very strong bond is provided between the glass substrate and the nickel coating. It has been found that a wire can be conventionally soldered to the nickel coating and a force between the wire and the substrate will generally cause the wire to separate from the solder connection before the bond between the nickel and the glass substrate is broken, or the nickel coating is stripped. Furthermore, the strong bond can be made by the method of this invention whether the glass is in a vitrious or devitrified form.

It has been found that the glass compositions can vary widely as to the glass modifier included in the lead silicate glass or lead borate glass. The various glass modifiers can be eliminated altogether and the strong bond still provided. It is essential that at least 9 weight percent lead oxide be present in the compositions to provide sufficient lead ions for a strong bond. A lead oxide content of 15 weight percent and greater is preferred because the reduction process can be carried out at lower temperatures.

What is claimed is:

1. A method of coating a glass substrate with an adherent layer of metal comprising the steps of:

reducing a thin layer of lead ions within a surface portion of a glass substrate consisting essentially of lead oxide and a glass former from the group consisting essentially of $SiO_2$ and $B_2O_3$ by contacting the substrate surface with reducing gas at elevated temperature, and depositing a nickel layer onto the substrate containing reduced lead.

2. The method of claim 1 wherein the nickle layer is deposited by precipitating nickel from a hypophosphite bath.

3. The method of claim 1 wherein the reducing gas consists essentially of hydrogen and the substrate is heated to about 200 to 600° C.

4. The method of claim 3 wherein the substrate is exposed to hydrogen flowing in a furnace at about 450° C. for about 1 to 4 hours.

5. The method of claim 1 wherein the glass consists essentially of at least 9 weight percent lead oxide.

6. A method for coating a glass substrate with an adherent layer of nickel comprising the steps of:

reducing lead ions at a surface portion of a potassium lead silicate glass substrate by contacting the substrate surface with reducing gas at elevated temperature; and depositing a nickel layer onto the substrate by contacting the substrate surface with reducing gas at elevated temperature; and depositing a nickel layer into the substrate containing reduced lead.

7. The method of claim 6 wherein the nickel is deposited by precipitating nickel from a hypophosphite bath.

8. A method of providing a strong bond between a lead containing glass and a metal coating comprising:

reducing lead ions at and within a surface portion of a glass substrate consisting essentially of $SiO_2$ and at least 9 weight percent lead oxide by contacting the substrate surface with reducing gas at elevated temperature, and depositing a nickel layer onto the substrate containing reduced lead by precipitating nickel from a hypophosphite bath.

9. A method of providing a strong bond between a lead containing glass and a metal coating comprising:

reducing lead ions at and within a surface portion of a glass substrate consisting essentially of $B_2O_3$ and at least 9 weight percent lead oxide by contacting the substrate surface with reducing gas at elevated temperature and, depositing a nickel layer onto the substrate containing reduced lead by precipitating nickel from a hypophosphite bath.

References Cited

UNITED STATES PATENTS

| | | | |
|---|---|---|---|
| 2,690,403 | 9/1954 | Gutzeit et al. ---- | 117—54 XR |
| 2,999,339 | 9/1961 | Hensler --------- | 117—124 XR |
| 3,222,218 | 12/1965 | Beltzer et al. -------- | 117—71 |
| 3,310,432 | 3/1967 | Griest et al. ------ | 117—130 XR |

ALFRED L. LEAVITT, *Primary Examiner.*

W. F. CYRON, *Assistant Examiner.*

U.S. Cl. X.R.

106—1; 117—124, 130

UNITED STATES PATENT OFFICE

CERTIFICATE OF CORRECTION

Patent No. 3,421,915 January 14, 1969

Eugene C. Letter

It is certified that error appears in the above identified patent and that said Letters Patent are hereby corrected as shown below:

Column 5, lines 1 to 3, cancel "depositing a nickel layer onto the substrate by contacting the substrate surface with reducing gas at elevated temperature; and"; line 4, "into" should read -- onto --.

Signed and sealed this 24th day of March 1970.

(SEAL)
Attest:

Edward M. Fletcher, Jr.
Attesting Officer

WILLIAM E. SCHUYLER, JR.
Commissioner of Patents